(12) United States Patent
Ogihara

(10) Patent No.: US 7,999,671 B2
(45) Date of Patent: Aug. 16, 2011

(54) RADIO COMMUNICATION APPARATUS AND INFORMATION PROCESSING APPARATUS

(75) Inventor: Mamoru Ogihara, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 260 days.

(21) Appl. No.: 12/379,862

(22) Filed: Mar. 3, 2009

(65) Prior Publication Data

US 2009/0243926 A1    Oct. 1, 2009

(30) Foreign Application Priority Data

Mar. 25, 2008   (JP) .................................. 2008-077688
Dec. 19, 2008   (JP) .................................. 2008-324018

(51) Int. Cl.
    *G08B 1/08*     (2006.01)
(52) U.S. Cl. ............ 340/539.13; 340/539.1; 340/539.11
(58) Field of Classification Search ............... 340/539.1, 340/539.11, 539.13, 539.32, 541, 825.49, 340/825.69; 342/357.09, 357.32, 357.51, 342/357.75; 455/456.1, 456.5, 456.6
    See application file for complete search history.

(56) References Cited

U.S. PATENT DOCUMENTS 7,737,841 B2 *   6/2010  Derrick et al. ........... 340/539.13

FOREIGN PATENT DOCUMENTS

JP        2002-111858        4/2002

* cited by examiner

*Primary Examiner* — Hung T. Nguyen
(74) *Attorney, Agent, or Firm* — Wenderoth, Lind & Ponack, L.L.P.

(57) ABSTRACT

A radio communication apparatus has a GPS function, is internally included in or is removably connected to an information processing apparatus. A reference position setting unit sets a reference position. A positional condition setting unit sets a positional condition about the reference position which is a condition for performing the processing under a predetermined security mode. A positional condition determining unit determines whether the condition for performing the processing under a predetermined security mode is obtained or not on the basis of the positional condition and its positional information obtained by the GPS function. A security mode processing performing unit performs processing under a predetermined security mode if it is determined that the condition for performing the processing under a predetermined security mode is obtained. If the information processing apparatus is powered off, the radio communication apparatus operates with the powered supplied from the information processing apparatus.

20 Claims, 9 Drawing Sheets

RADIO COMMUNICATION APPARATUS AND INFORMATION PROCESSING APPARATUS

BACKGROUND OF THE INVENTION

1. Field of the Invention

The present invention relates to a radio communication apparatus that performs security processing on an information processing apparatus, such as a personal computer (PC), and an information processing apparatus having the radio communication apparatus.

2. Description of the Related Art

FIG. 8 shows a configuration example of the personal computer (PC).

The PC in this example includes a battery 1, a power supply control unit 2, a data communication radio module 101 and an antenna 111 thereof, an external interface control unit 4, a clock 5, a CPU (Central Processing Unit) 6, a power supply switch 7, a mouse 8, a keyboard 9, a hard disk 10, a main memory 11, a display unit 12 and a display control unit 13.

In FIG. 8, the same reference numerals refer to the same processing units as those shown in FIG. 1, which are referred in the descriptions on embodiments, which will be described later. It is not intended here that they limit the invention unnecessarily.

Operations to be performed by the PC in this example will be described schematically.

The CPU 6 detects input from the power supply switch 7. If any input is received from the battery 1 or an external power supply, the CPU 6 controls the power supply control unit 2 such that power can be supplied to the blocks (or processing units) If the blocks are powered on, reference clocks are output from the clock 5 to the CPU 6. If the power and clocks are supplied in a stable manner, the CPU 6 completely shifts to an operation, starts a program required for booting the PC, loads important information therefor from the hard disk 10, processes it on the main memory 11 at a high speed, and boots the PC such that functions of the mouse 8, the keyboard 9 and the display unit 12, for example, can operate normally.

After the processing of booting the PC completes, a user (or human) uses the mouse 8 and/or the keyboard 9, for example, to start application software in the hard disk 10 and connect a data communication module (such as the data communication radio module 101) to an external interface such as a USB, a serial port and a PC slot and uses the mouse 8 and/or the keyboard 9 to control the data communication module through the CPU 6 and/or the external interface control unit 4. For example, by signing a necessary contract with a provider or a communication carrier, data exchanges are allowed over the Internet or by e-mails.

Patent Document 1: JP-A-2002-111858

However, without the power supply to a PC, data communication such as exchange of mail is not allowed even by attaching a data communication card (which is an example of the data communication module) to the external interface.

Furthermore, a conventional data communication module is specific to data communication, and it may not be located even when it is left behind or stolen. If a user notices that it is stolen, it is difficult to prevent the leakage of information therefrom.

In order to prevent this, an expensive security tool, for example, may be installed to take security measures.

SUMMARY OF THE INVENTION

The invention was made in view of such conventional situations, and it is an object of the invention to provide a radio communication apparatus and information processing apparatus that can effectively prevent the problem of information leakage from a forgotten or stolen PC.

FIRST CONFIGURATION EXAMPLE

[1-1]

In order to achieve the object, a radio communication apparatus according to an aspect of the invention has the following configuration.

That is, the radio communication apparatus has a GPS function, is internally included in or is removably connected to an information processing apparatus and operates with the power supplied from the information processing apparatus.

Charging means charges the power supplied from the information processing apparatus. Reference position setting means sets a reference position. Positional condition setting means sets a positional condition about the reference position which is a condition for performing the processing under a predetermined security mode. Positional condition determining means determines whether the condition for performing the processing under a predetermined security mode is obtained or not on the basis of the positional condition set by the positional condition setting means and its positional information obtained by the GPS function. Security mode processing performing means performs processing under a predetermined security mode if the positional condition determining means determines that the condition for performing the processing under a predetermined security mode is obtained.

If the information processing apparatus is powered off, the radio communication apparatus operates with the power charged by the charging means.

Therefore, if the information processing apparatus (such as a PC) supplies power thereto, the radio communication apparatus (such as a radio communication module) operates with the power supply. Even if the power supply from the information processing apparatus is off (or no power is supplied from the information processing apparatus), the radio communication apparatus can operate with the charged power. If a predetermined positional condition about a reference position is not satisfied, the processing under a predetermined security mode can be performed (automatically). By using those functions, the problem of information leakage from a forgotten or stolen information processing apparatus can be prevented effectively.

Here, the GPS function may be one generally available and, more specifically, may be a function that receives information from a GPS satellite and obtains (or calculates, for example) its positional information, a function that uses a radio communication function to receive information on a GPS satellite, for example, from a server and obtain (or calculate, for example) its positional information, a function that uses a radio communication function to receive and obtain its positional information from a server or a combination of them, for example.

The radio communication apparatus may be internally included in an information processing apparatus or may be removably connected to an information processing apparatus, for example.

The charging means may vary.

The reference position may be defined on the basis of an operation by a user (human) or under the control of an external apparatus (such as an information processing apparatus) or may be automatically defined by the radio communication apparatus or may be predefined in the radio communication apparatus.

The reference position may vary and may be a position designated by a user or an external apparatus, for example, or a position where the radio communication apparatus stays at the same position (or in the neighborhood of a predetermined distance) for a predetermined period of time if any.

The positional condition may be defined on the basis of an operation by a user (human) or under the control of an external apparatus (such as an information processing apparatus), may be automatically defined by the radio communication apparatus or may be predefined in the radio communication apparatus.

The positional condition about the reference position may vary. For example, if the radio communication apparatus is away from the reference position by a predetermined distance or more, the processing under a predetermined security mode may be performed. More specifically, the condition may be defined with the radius or diameter about the reference position, for example.

The processing under a predetermined security mode may vary and may include processing of locking the information processing apparatus, processing of powering on the information processing apparatus, processing of powering off the information processing apparatus, processing of deleting information stored in a predetermined memory in the information processing apparatus, and processing of outputting a warning sound, processing of transmitting its positional information to a predetermined e-mail address or a predetermined apparatus, for example.

The processing under a predetermined security mode may be defined (may be changed) on the basis of an operation by a user (human) or under the control of an external apparatus (such as an information processing apparatus), may be automatically defined (may be changed) by the radio communication apparatus or may be predefined in the radio communication apparatus.

According to embodiments of the invention, if it is determined that a condition for performing processing under a predetermined security mode is satisfied and after the security mode is defined, a predetermined e-mail including information may be transmitted to a pre-registered address, for example, periodically (such as every preset constant period of time). Alternatively, a predetermined e-mail may be transmitted to a pre-registered address every time the distance from the reference position increases by a constant distance (such as preset distance).

For example, transmitting its positional information to a predetermined e-mail address or a predetermined apparatus after a lapse of a predetermined period of time or after moving by a predetermined distance allows easy recognition of location of the information processing apparatus, which is useful for searching the information processing apparatus.

[1-1-2]

According to another configuration example of the invention, there is provided a radio communication apparatus having a GPS function, being internally included in or being removably connected to an information processing apparatus and operating with the power supplied from the information processing apparatus, the radio communication apparatus including:

charging means for charging the power supplied from the information processing apparatus;

reference position setting means for setting a reference position;

positional condition determining means for determining whether the condition for performing the processing under a predetermined security mode is obtained or not on the basis of the condition for performing the processing under a predetermined security mode and its positional information obtained by the GPS function; and security mode processing performing means for performing processing under a predetermined security mode if the positional condition determining means determines that the condition for performing the processing under a predetermined security mode is obtained, wherein, if the information processing apparatus is powered off, the radio communication apparatus operates with the power charged by the charging means.

[1-2]

The radio communication apparatus according to the invention in [1-1] may have the following configuration, for example.

That is, the radio communication apparatus may have a radio communication function, receive GPS assist data transmitted over a predetermined network by the radio communication function and obtain its positional information.

Here, the predetermined network may vary and may be a system network for cellular phones, for example.

[1-3]

According to the invention, in [1-1] or [1-2], an information processing apparatus including a radio communication apparatus as described above may be provided.

Therefore, the problem of information leakage from a forgotten or stolen information processing apparatus can be prevented effectively.

Here, the radio communication apparatus and the information processing apparatus may vary.

[1-4]

In one configuration example according to the invention, the processing under a predetermined security mode may include processing of locking the information processing apparatus.

[1-5]

In one configuration example according to the invention, the processing under a predetermined security mode may include processing of powering on the information processing apparatus.

[1-6]

In one configuration example according to the invention, the processing under a predetermined security mode may include processing of powering off the information processing apparatus.

[1-7]

In one configuration example according to the invention, the processing under a predetermined security mode may include processing of deleting information stored in a predetermined memory in the information processing apparatus.

[1-8]

In one configuration example according to the invention, the processing under a predetermined security mode may include processing of outputting a warning sound.

[1-9]

In one configuration example according to the invention, the processing under a predetermined security mode may include processing of transmitting an e-mail including its positional information to a predetermined e-mail address or a predetermined apparatus.

[1-10]

In one configuration example according to the invention, the e-mail may have information describing that a security mode has been set in [1-9] above.

SECOND CONFIGURATION EXAMPLE

A second configuration example has a similar configuration and can provide similar effects to those of the first configuration example except that the radio communication apparatus has no charging means, for example. Therefore, detail descriptions on the similar parts will be omitted in [Second Configuration Example].

[2-1]

According to the second configuration example of the invention, there is provided a radio communication apparatus having a GPS function, being internally included in or being removably connected to an information processing apparatus and operating with the power supplied from the information processing apparatus, the radio communication apparatus including:

reference position setting means for setting a reference position;

positional condition setting means for setting a positional condition about the reference position which is a condition for performing the processing under a predetermined security mode;

positional condition determining means for determining whether the condition for performing the processing under a predetermined security mode is obtained or not on the basis of the positional condition set by the positional condition setting means and its positional information obtained by the GPS function; and security mode processing performing means for performing processing under a predetermined security mode if the positional condition determining means determines that the condition for performing the processing under a predetermined security mode is obtained, wherein, even if the information processing apparatus is powered off, the radio communication apparatus operates with the power supplied from the information processing apparatus.

Therefore, if the information processing apparatus (such as a PC) supplies power thereto, the radio communication apparatus (such as a radio communication module) operates with the power supply. Even if the power supply from the information processing apparatus is off, the radio communication apparatus can operate with the power supplied from the information processing apparatus. If a predetermined positional condition about a reference position is satisfied, the processing under a predetermined security mode can be performed (automatically). By using those functions, the problem of information leakage from a forgotten or stolen information processing apparatus can be prevented effectively.

[2-1-2]

According to another configuration example of the invention, there is provided a radio communication apparatus having a GPS function, being internally included in or being removably connected to an information processing apparatus and operating with the power supplied from the information processing apparatus, the radio communication apparatus including:

reference position setting means for setting a reference position;

positional condition determining means for determining whether the condition for performing the processing under a predetermined security mode is obtained or not on the basis of the condition for performing the processing under a predetermined security mode and its positional information obtained by the GPS function; and security mode processing performing means for performing processing under a predetermined security mode if the positional condition determining means determines that the condition for performing the processing under a predetermined security mode is obtained, wherein, even if the information processing apparatus is powered off, the radio communication apparatus operates with the power supplied by the information processing apparatus.

[2-2]

The radio communication apparatus according to the invention in [2-1] may have a radio communication function, receive GPS assist data transmitted over a predetermined network by the radio communication function and obtain its positional information.

[2-3]

According to the invention, in [2-1] or [2-2], an information processing apparatus including a radio communication apparatus as described above may be provided.

Therefore, the problem of information leakage from a forgotten or stolen information processing apparatus can be prevented effectively.

Here, the information processing apparatus of the configuration example is configured to always supply power to the radio communication apparatus if possible even when the power supply is off. Notably, in a case where the information processing apparatus does not receive external power supply and no power remains internally in the information processing apparatus, the information processing apparatus may not be required to supply power to the radio communication apparatus.

[2-4]

In one configuration example according to the invention, the processing under a predetermined security mode includes processing of locking the information processing apparatus.

[2-5]

In one configuration example according to the invention, the processing under a predetermined security mode may include processing of powering on the information processing apparatus.

[2-6]

In one configuration example according to the invention, the processing under a predetermined security mode may include processing of powering off the information processing apparatus.

[2-7]

In one configuration example according to the invention, the processing under a predetermined security mode may include processing of deleting information stored in a predetermined memory in the information processing apparatus.

[2-8]

In one configuration example according to the invention, the processing under a predetermined security mode may include processing of outputting a warning sound.

[2-9]

In one configuration example according to the invention, the processing under a predetermined security mode may include processing of transmitting an e-mail including its positional information to a predetermined e-mail address or a predetermined apparatus.

[2-10]

In one configuration example according to the invention, the e-mail may have information describing that a security mode has been set in [2-9] above.

As described above, the radio communication apparatus and information processing apparatus according to the invention can effectively prevent the problem of information leakage from the forgotten or stolen information processing apparatus.

DESCRIPTION OF THE PREFERRED EMBODIMENTS

Embodiments of the invention will be described with reference to drawings.

A first embodiment of the invention will be described.

Figure 1:
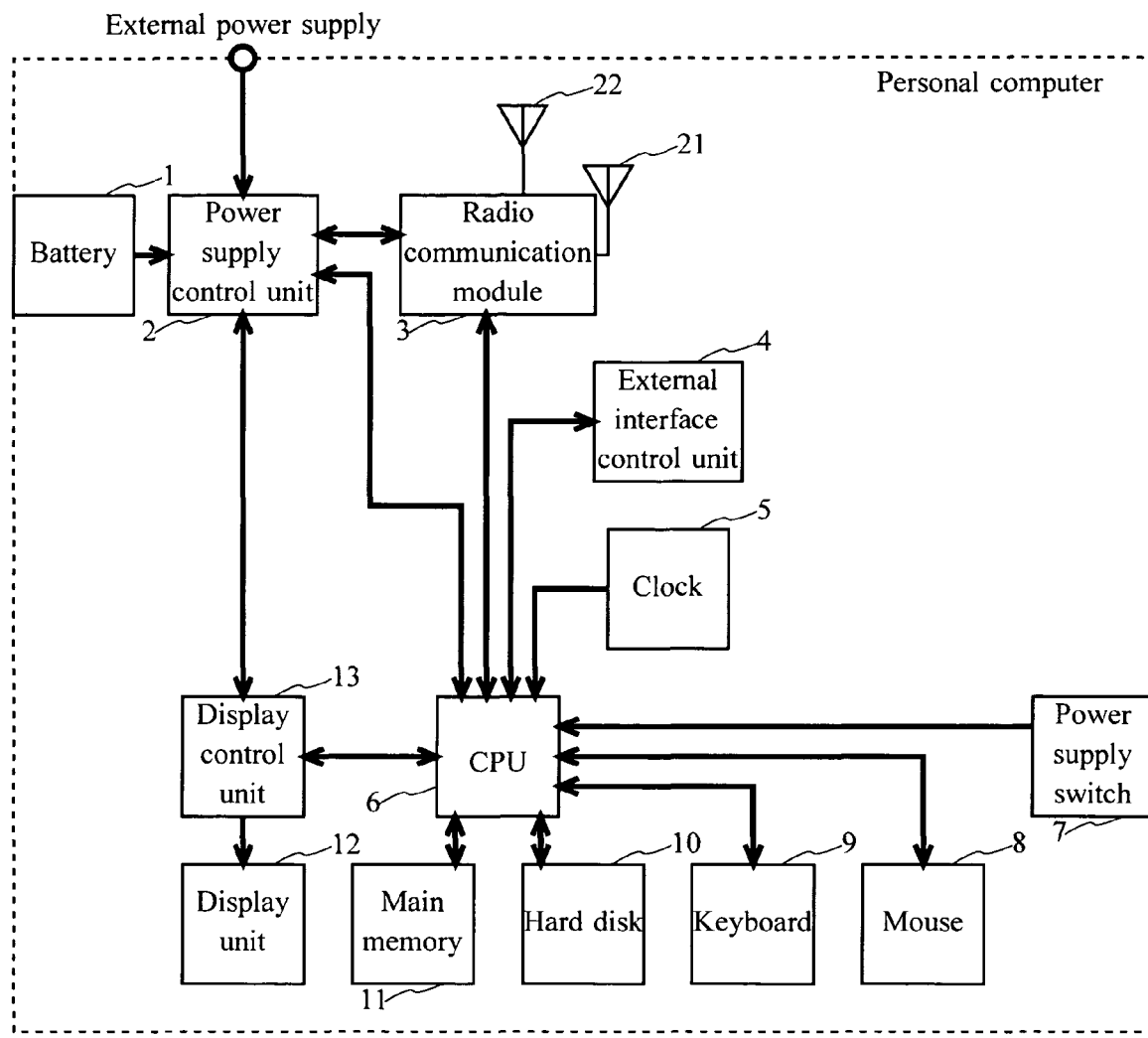
FIG. 1 is a diagram showing a configuration example of a personal computer according to an embodiment of the invention.

FIG. 1 shows a configuration example of a personal computer (PC) according to an embodiment of the invention.

A PC in this example includes a battery 1, a power supply control unit 2, a radio communication module 3 and antennas 21 and 22 thereof, an external interface control unit 4, a clock 5, a CPU 6, a power supply switch 7, a mouse 8, a keyboard 9, a hard disk 10, a main memory 11, a display unit 12 and a display control unit 13.

Figure 8:
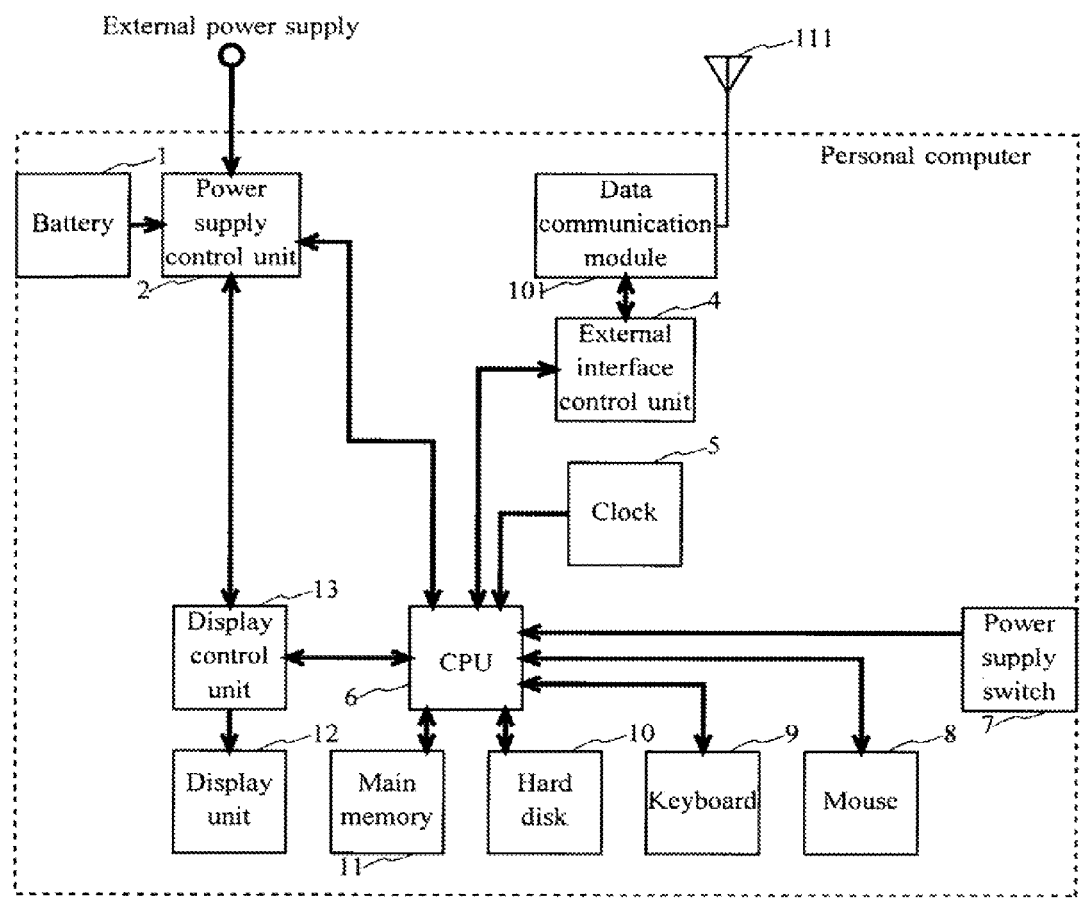
FIG. 8 is a diagram showing a configuration example of a personal computer according to a background technology.

Here, the basic configuration and operations of the PC in this embodiment are similar to the configuration and operations of the PC in FIG. 8. In the description on this embodiment, different configurations and operations will be mainly described in detail.

The PC in this embodiment is different in configuration from the PC shown in FIG. 8 in that it includes the radio communication module 3 and antennas 21 and 22 thereof instead of the data communication radio module 101 and the antenna 111 thereof, the radio communication module 3 connects to the power supply control unit 2, and the radio communication module 3 connects to the CPU 6 without through the external interface control unit 4.

Figure 2:
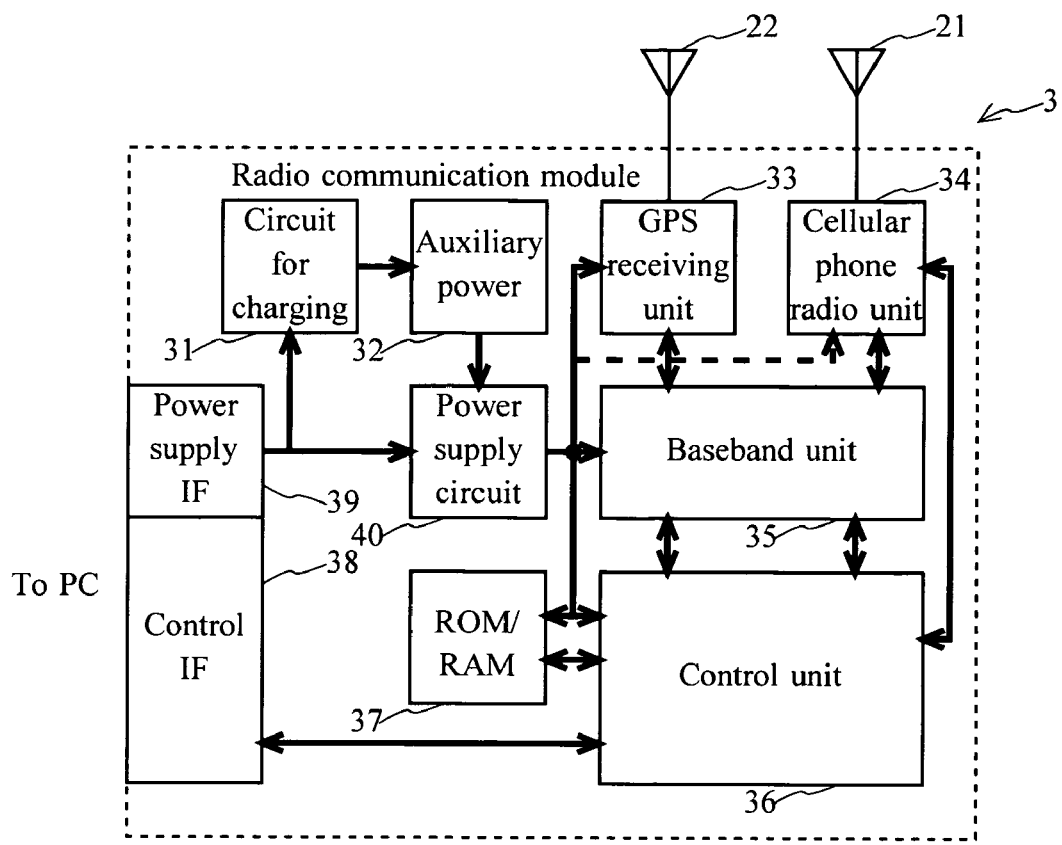
FIG. 2 is a diagram showing a configuration example of a radio communication module according to a first embodiment of the invention.

FIG. 2 shows a configuration example of the radio communication module 3.

The radio communication module 3 in this embodiment includes a circuit for charging 31, an auxiliary power 32, a GPS (Global Positioning System) receiving unit 33, a cellular phone radio unit 34, a baseband unit 35, a control unit 36, a ROM (Read Only Memory)/RAM (Random Access Memory) 37, a control interface (control IF) 38, a power supply interface (power supply IF) 39 and a power supply circuit 40.

The antenna 21 of the cellular phone radio unit 34 is an antenna for a cellular phone communication, and the antenna 22 of the GPS receiving unit 23 is an antenna for receiving signals from a GPS.

The circuit for charging 31 charges the auxiliary power 32.

The auxiliary power 32 is a rechargeable auxiliary power supply.

The GPS receiving unit 33 receives data of a navigation message transmitted from a GPS satellite by radio through the antenna 22.

Here, the data (navigation data) of a navigation message may include, for example, orbit data on a GPS satellite and auxiliary data, which are used for calculating the position on the GPS data receiver side.

The cellular phone radio unit 34 is connected to a system such as a cellular phone to receive/transmit signals through the antenna 21.

The baseband unit 35 processes a receive signal from a GPS or a transmit/receive signal to/from a wireless cellular phone.

The control unit 36 controls functions in the radio communication module 3. The control unit 36 accesses the ROM/RAM 37 to control operations of the blocks (processing units) and control the exchange of signals with the PC through the control IF 38.

The ROM/RAM 37 has a ROM and/or a RAM.

The control IF 38 is an interface to be connected to the CPU 6 of the PC.

The power supply IF 39 is an interface to be connected to the power supply control unit 2 of the PC.

The power supply circuit 40 switches between voltage supplied from the auxiliary power 32 and voltage supplied from the power supply IF 39 so as to supply stable voltage to the blocks.

Now, a specific example of the GPS will be described briefly.

For example, the GPS function used for a cellular phone may be MS-based, MS-assisted or autonomous.

The MS-based function is network-assisted, and assist data is transmitted from an assist server to a mobile terminal at predetermined cycles. Then, the mobile terminal calculates the position on the basis of the assist data.

The MS-assisted function is network-assisted, and a server calculates the position and transmits the result only to a mobile terminal.

The autonomous function is not network-assisted and stand-alone, and a mobile terminal calculates all positions.

Here, assist data may include, for example, acquired information such as the position of a GPS satellite and the position of a base station.

For example, the assist data may include almanac data or ephemeris data.

The almanac data is schematic orbit information of all available satellites. Notably, almanac data corresponds to navigation data of all satellites.

The ephemeris data is detail orbit information of a satellite that is responsible for the current position.

The radio communication module 3 in this example has main features of:

[Feature 1] Because it internally includes the auxiliary power 32, it can operate with its power supply even when no power is supplied from the PC.

[Feature 2] Because it has both of the GPS receiving unit 33 and the cellular phone radio unit 34, the radio communication module 3 by itself can obtain navigation message data from a GPS satellite or GPS assist information (assist data) from a network of cellular phones to acquire the positional information.

Therefore, like in this example, the implementation of the radio communication module 3 that is connectable to a GPS function and a network of cellular phones, for example, in a PC may provide the radio communication module 3 in the PC having the radio communication module 3 with the positional information on the position where they (which are the radio communication module 3 itself and the PC) exist.

In this embodiment, the use of the radio communication module 3 and the addition of new functions to the software can provide various effects. Because the radio communication module 3 and the CPU 6 of the PC are connected, when the ROM 37 within the radio communication module 3 or the hard disk 10 of the PC has software, both operations from the radio communication module 3 and operations from the PC are allowed. In a case where the ROM 37 within the radio communication module 3 stores software, main functions can be achieved only with the radio communication module 3 even when the PC is not on.

In this embodiment, the radio communication module 3 is mounted in the PC, and the radio communication module 3 can therefore perform security processing on the PC with its functions.

Figure 3:
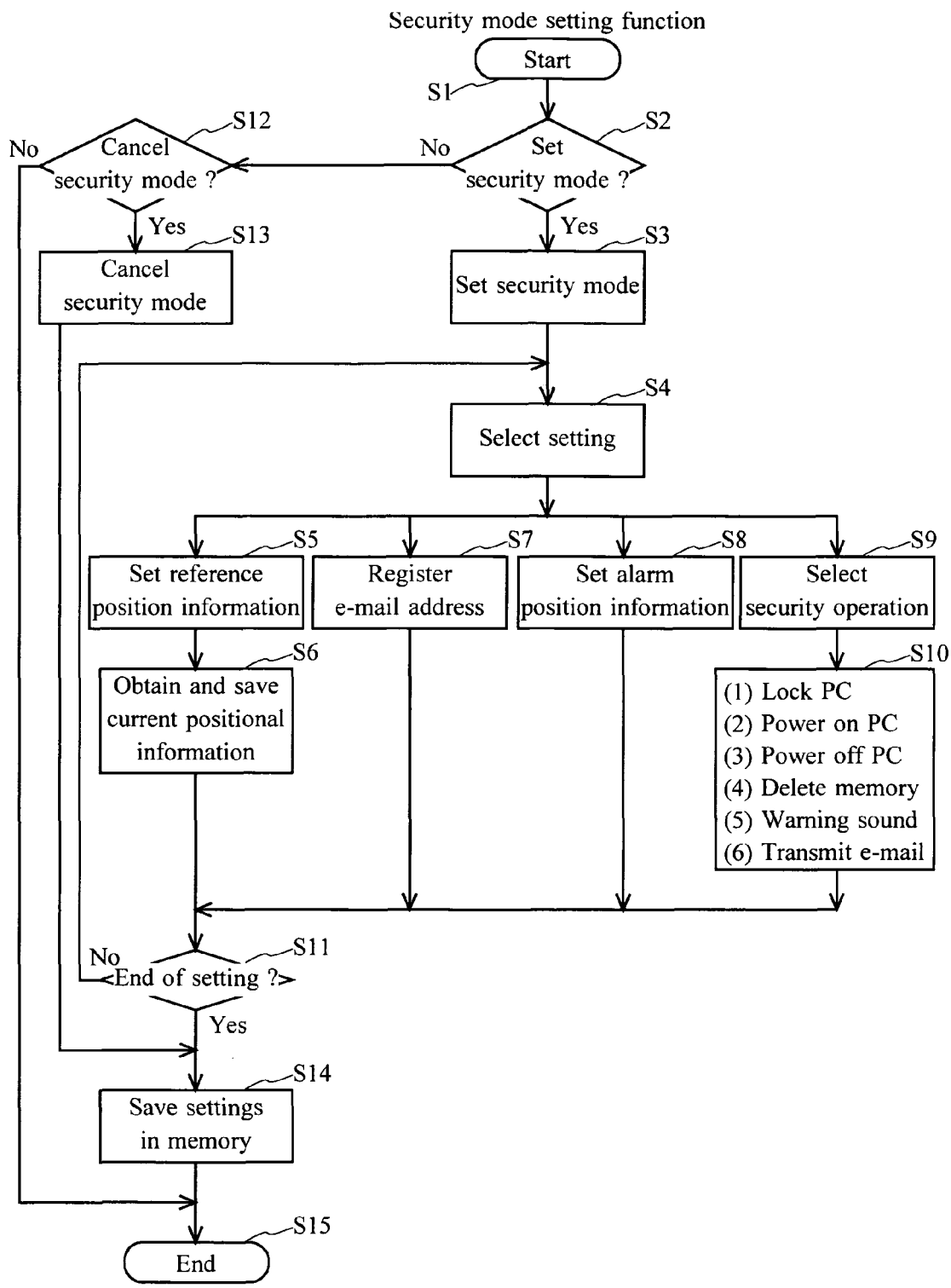
FIG. 3 is a diagram showing an example of a routine of processing by a security mode setting function of the radio communication module.

With reference to the flowchart shown in FIG. 3, an example of processing with a security mode setting function by the radio communication module 3 will be described.

Notably, the security mode setting function may be provided in the radio communication module 3 itself, but a detail of an operation by a user may be input from the CPU 6 through the mouse 8 and/or the keyboard 9 of the PC, and a message to a user may be displayed on the display unit 12 as required. Alternatively, the radio communication module 3 itself may include a function unit that receives a detail of an operation by a user and/or a display unit.

If the processing by the security mode setting function starts (step S1), whether the security mode is to be validated or not is selected based on an operation by a user, for example (step S2).

If the security mode is validated (step S3), a setting under the security mode is selected on the basis of an operation by a user, for example (step S4).

If the setting of reference position information describing the position where the PC is placed is selected as the setting under the security mode (step S5), the current positional information is obtained and is saved (or stored) in a memory (step S6).

Here, current positional information may be obtained by using the GPS function, for example. For example, the GPS function of the radio communication module 3 may be used to grasp the current positional information, and if the positional information does not change for a predetermined period of time or longer, it can be handled as the reference position information.

In another example, the current positional information can be obtained by receiving the input of predetermined information from a user, and, for example, the radio communication module 3 may receive information on the latitude and longitude from a user through the PC and detect the current positional information on the basis of the input information. Alternatively, the radio communication module 3 may have map information and may receive input of information on an address from a user through the PC and detect the current positional information on the basis of the input information.

If the security mode is set to register an e-mail address to allow the instruction of a security operation by mail, the e-mail address based on an operation by a user, for example, is registered (stored) in a memory (step S7).

Notably, having described the case where an e-mail address is defined which allows the instruction of a security operation to the radio communication module 3, an e-mail address may be defined to which the positional information of the radio communication module 3 may be transmitted from the radio communication module 3, for example. A common e-mail address may be defined as the e-mail addresses (that is, the address of a transmitter that instructs and and the address of the transmitter of the positional information).

On the basis of an operation by a user, a time interval (or periodical time interval) maybe defined in a configuration, if any, that a predetermined e-mail is transmitted periodically, or a predetermined distance may be defined in a configuration, if any, that a predetermined e-mail is transmitted at every predetermined distance from the reference position.

If the security mode is defined to select alarm positional information for determining the distance from the reference position for performing a security operation, the alarm positional information is defined (stored) in a memory on the basis of an operation by a user, for example (step S8).

Here, the alarm positional information may be defined arbitrarily. For example, information such as the radius or diameter about the reference position may be used to identify a circular range.

If the security mode is defined to select the selective setting of a security operation (step S9), the actually performed security operation is selected on the basis of an operation by a user, for example (step S10). More specifically, the security operations may include locking the PC, powering on (ON) the PC, powering off (OFF) the PC, deleting data in a memory, outputting a warning sound and transmitting a predetermined e-mail, for example.

Transmitting a predetermined e-mail in this case may include transmitting a predetermined e-mail periodically or transmitting a predetermined e-mail at every predetermined distance from a reference position.

After the setting completes, whether the setting processing ends or not is determined on the basis of an operation by a user, for example (step S11). If not, the processing returns to step S4 again. If so, the setting is saved (stored) in a memory (step S14), and the processing ends (step S15).

If validating the security mode is not selected in the processing in step S2, whether the security mode is cancelled or not is determined on the basis of an operation by a user, for example (step S12).

If the security mode is defined to cancel (step S13), the setting is saved (stored) in a memory (step S14), and the processing ends (step S15).

On the other hand, if cancelling the security mode is not selected, the processing ends (step S15).

Figure 4:
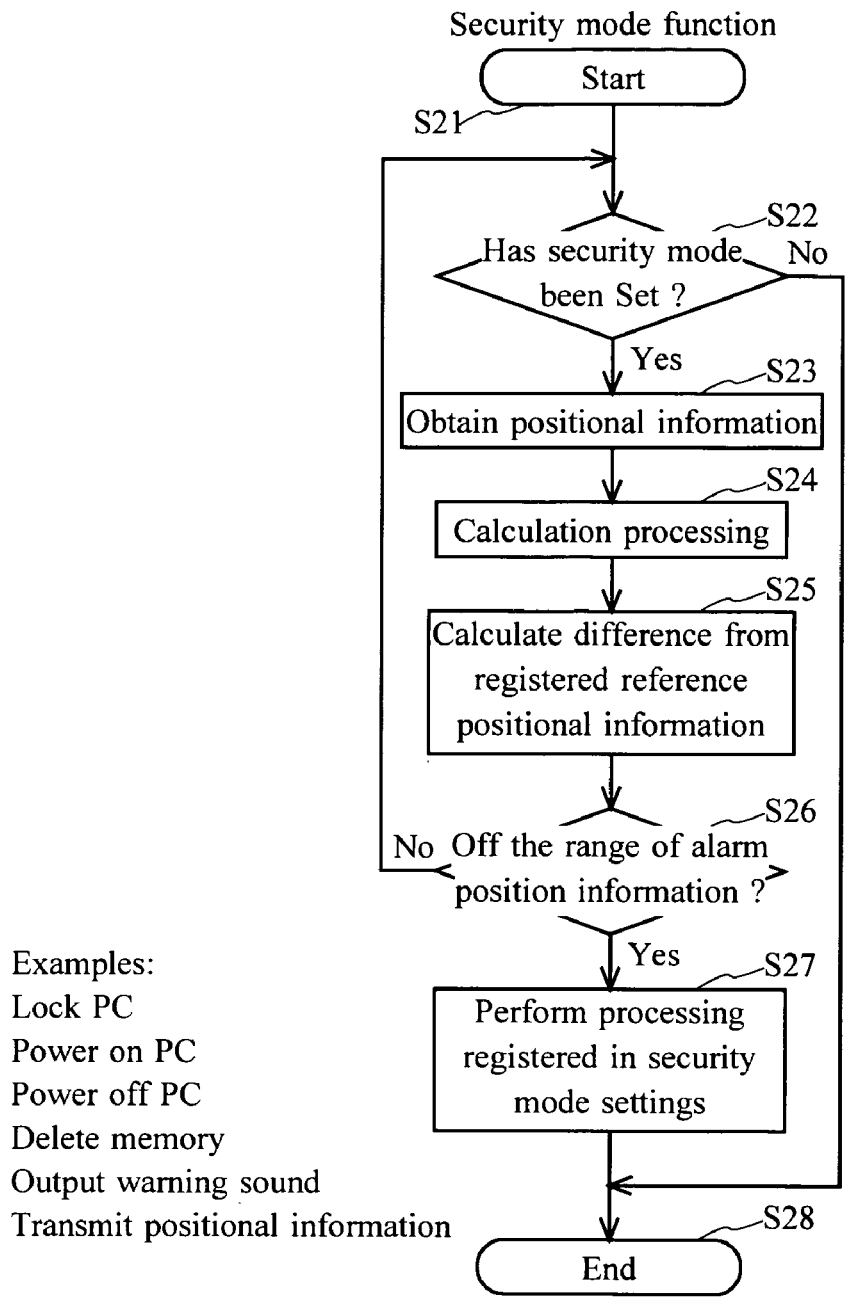
FIG. 4 is a diagram showing an example of a routine of processing by a security mode setting function of the radio communication module.

With reference the flowchart shown in FIG. 4, an example of the processing by the security mode function in the radio communication module 3 will be described. Notably, the security mode function is included in the radio communication module 3.

If the security mode function starts (step S21), whether the security mode has been defined or not is determined (step S22). If not, the processing ends (step S28).

On the other hand, if the security mode has been defined, the radio communication module 3 uses the GPS function to obtain the positional information from the reception information on a navigation message from the GPS satellite and/or reception information on GPS assist information from the cellular phone network (step S23). By performing predetermined calculation processing (step S24), the difference between the obtained positional information and the registered reference position information is calculated (step S25). Then, whether its positional information is off the range of the alarm positional information or not is determined (step S26).

Notably, because the distance to the satellite and/or the distance to the base station are known by the calculation like this, for example, the calculation can be performed relatively easily by the comparison in traveling distance.

If its position is not off the range of alarm positional information, the processing returns to step S22 again.

On the other hand, if its position is off the range of the alarm positional information, the radio communication module 3 performs the registered processing under the security mode setting (step S27), and the processing ends (step S28).

Here, in this embodiment, the registered processing includes a part or all of locking the PC, powering on, powering off, deleting data in the memory, outputting a warning sound, and transmitting an e-mail on the positional information.

Figure 5:
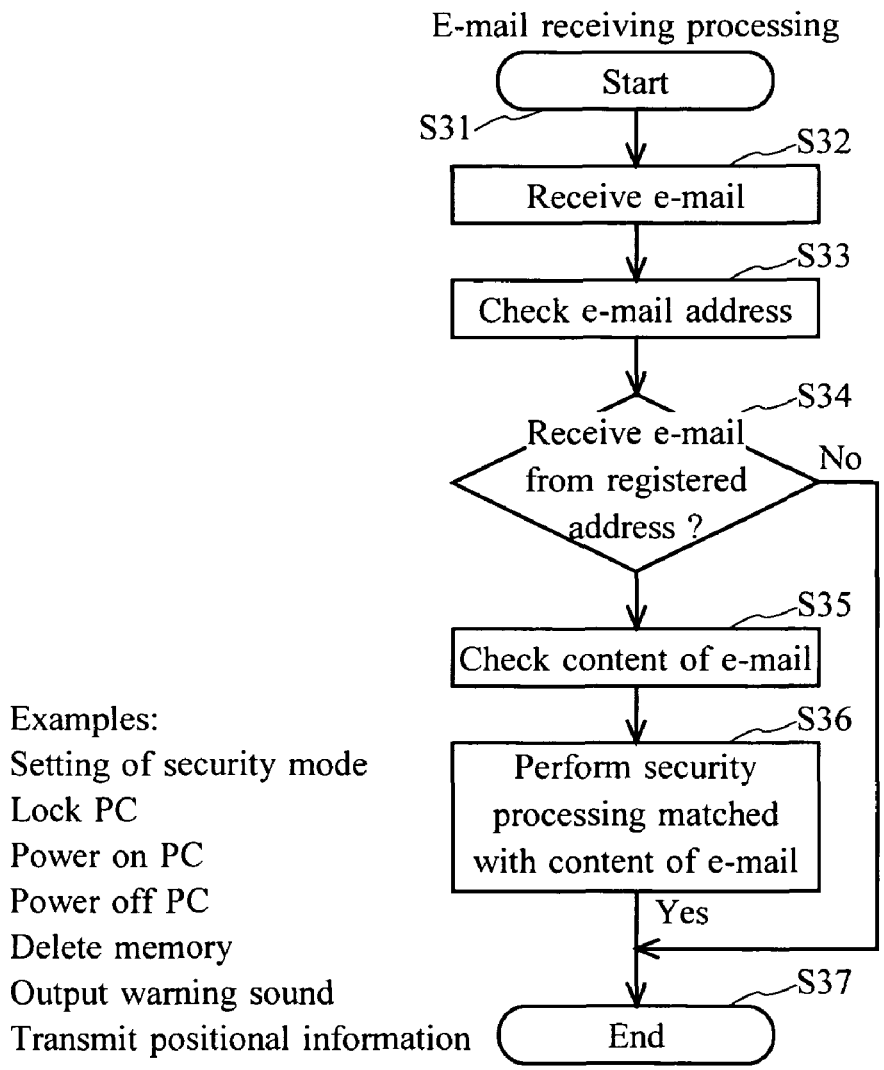
FIG. 5 is a diagram showing an example of a routine of e-mail receiving processing by the radio communication module.

With reference to the flowchart shown in FIG. 5, an example of processing of receiving an e-mail in the radio communication module 3 will be described. Notably, the function of e-mail receiving processing is provided in the radio communication module 3.

If the e-mail receiving processing starts (step S31), an e-mail is received (step S32). By checking the e-mail address (step S33), whether the transmitter address of the received e-mail is pre-registered or not, that is, whether the received e-mail is from a pre-registered address or not is determined (step S34). If not, the processing ends (step S37).

On the other hand, if the received e-mail is from a pre-registered address, the content of the e-mail is checked (step S35).

In this embodiment, the regularity (or correspondence relationship) between the content of the e-mail and the settings of the security processing is determined in advance. More specifically, for example, information like "perform processing of outputting a warning sound if the content of the e-mail is "ABC"" is defined in advance.

Then, the radio communication module 3 performs the security processing corresponding to the content of the e-mail (step S36), and the processing ends (step S37).

More specifically, the security processing may include processing of defining the security mode, PC locking processing, PC powering-on processing, PC powering-off processing, processing of deleting data in a memory, warning sound output processing and processing of transmitting positional information by an e-mail.

In this way, by comparing the content of the received e-mail and the predefined setting of the security corresponding to the content, the security setting instructed by the e-mail can be detected. Thus, the reception of the e-mail notifies the setting for the security processing to the radio communication module 3. As a result, the radio communication module 3 performs the instructed security processing.

Notably, if the received e-mail is not from one of the registered addresses or has a different content, no security processing is performed.

Figure 6:
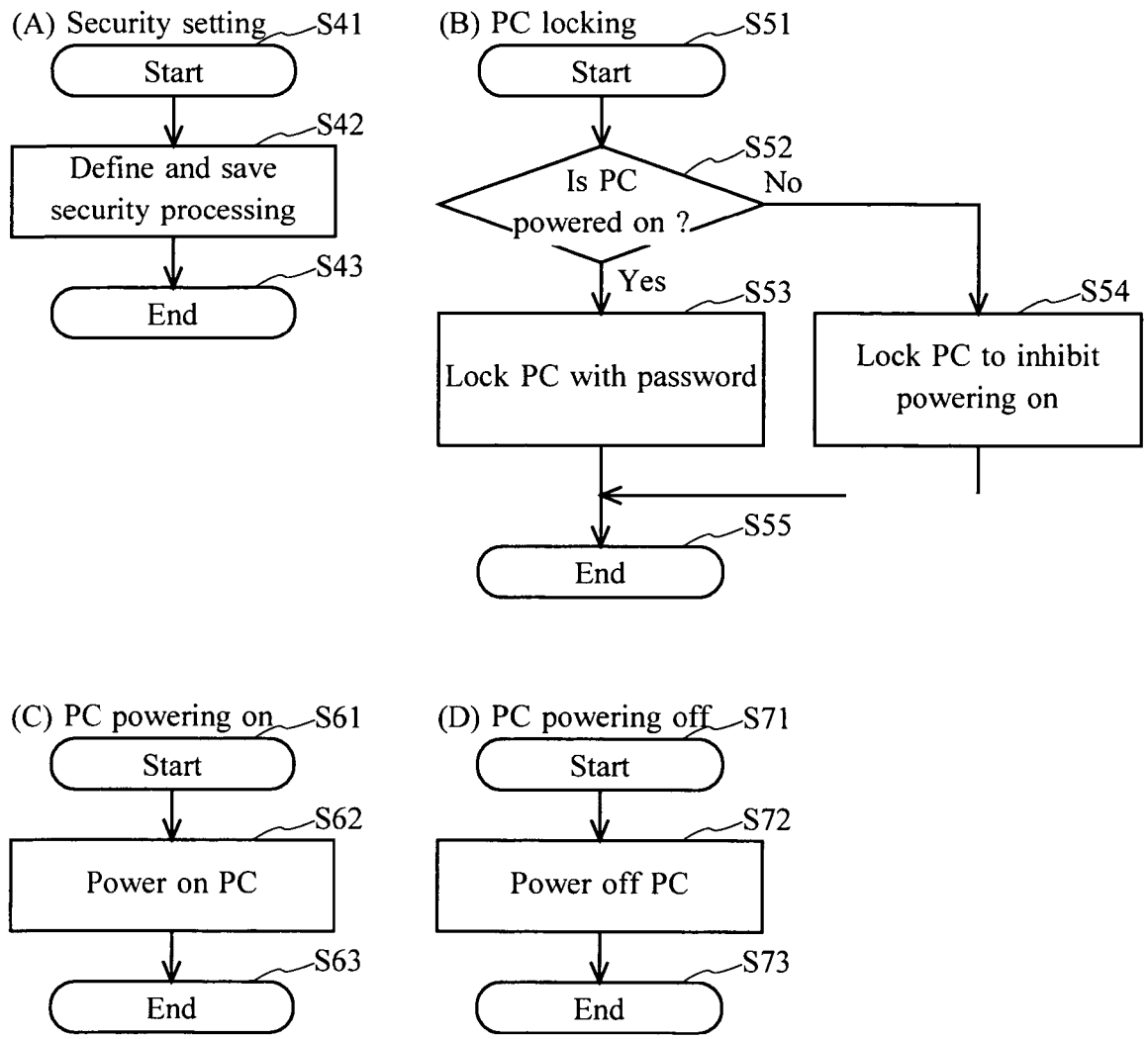
FIG. 6A is a diagram showing an example of a routine of security setting processing by the radio communication module.
FIG. 6B is a diagram showing an example of a routine of PC locking processing by the radio communication module.
FIG. 6C is a diagram showing an example of a routine of PC powering on processing by the radio communication module.
FIG. 6D is a diagram showing an example of a routine of PC powering off processing by the radio communication module.

With reference to the flowchart shown in FIG. 6A, an example of processing by the security setting function in the radio communication module 3 will be described. Notably, the security setting function may be provided in radio communication module 3 itself, for example.

If the processing of the security setting function starts (step S41), the processing for defining the security is performed and the settings are saved (step S42). Then, the processing ends (step S43).

Notably, having described the settings under a security mode above, the security mode can be defined to cancel.

With reference to the flowchart shown in FIG. 6B, an example of the processing by the PC locking function in the radio communication module 3 will be described. Notably, the PC locking function is provided in the radio communication module 3.

If the processing of the PC locking function starts (step S51), whether the PC is powered on or not is determined (step S52).

If so, the PC is locked with a password (step S53). If not, the PC is locked to inhibit the power supply thereto (step S54).

Then, the processing ends (step S55).

With reference to the flowchart shown in FIG. 6C, an example of the processing by PC powering-on function in the radio communication module 3 will be described. Notably, the PC powering on function is provided in the radio communication module 3.

If the processing by the PC powering on function starts (step S61), the PC is powered on (step S62), and the processing ends (step S63).

With reference to the flowchart shown in FIG. 6D, an example of the processing by the PC powering off function in the radio communication module 3 will be described. Notably, the PC powering off function is provided in the radio communication module 3.

If the processing by the PC powering off function starts (step S71), the PC is powered off (step S72), and the processing ends (step S73).

Figure 7:
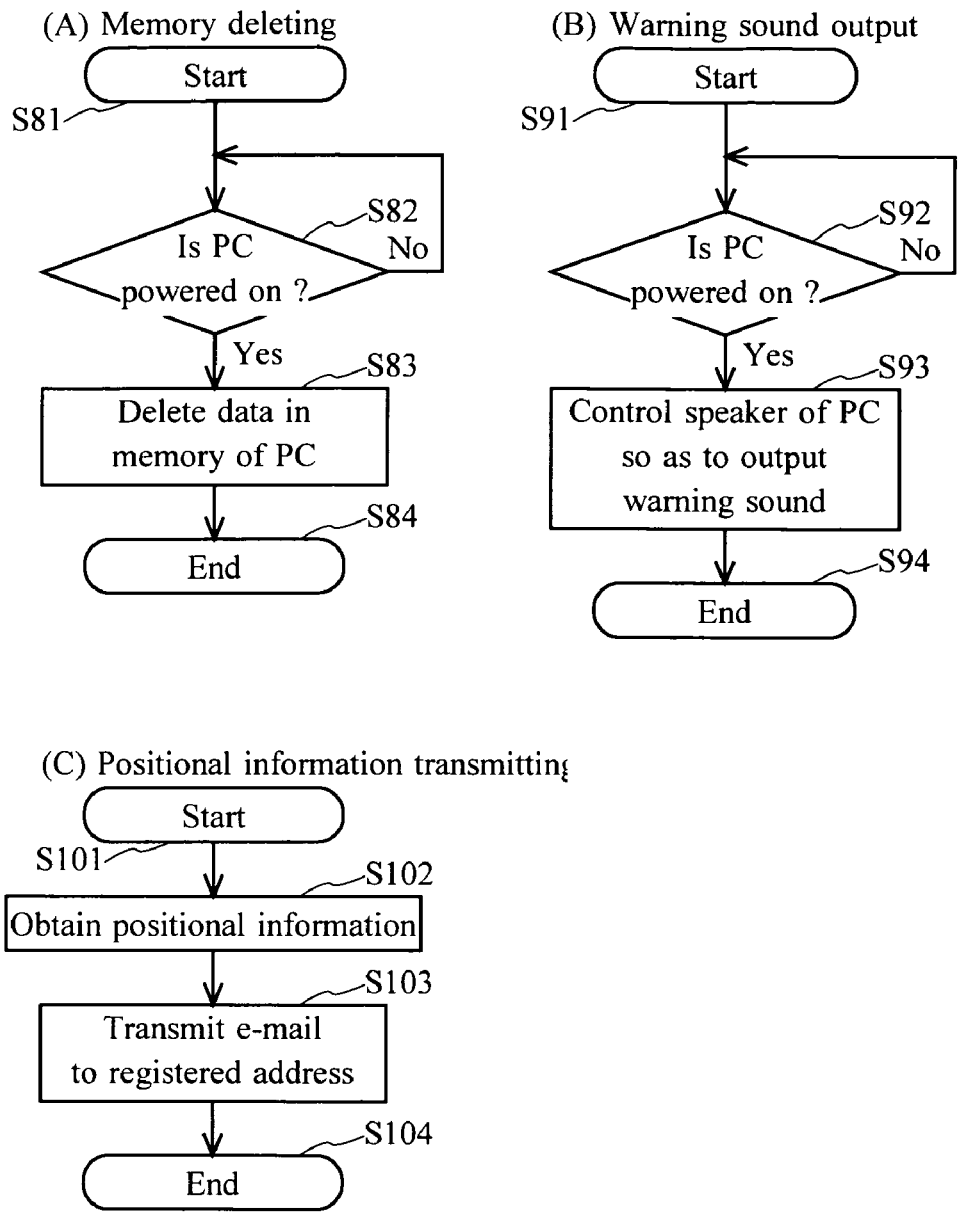
FIG. 7A is a diagram showing an example of a routine of memory deleting processing by the radio communication module.
FIG. 7B is a diagram showing an example of a routine of outputting a warning sound by the radio communication module.
FIG. 7C is a diagram showing an example of a routine of positional information transmitting processing by the radio communication module.

With reference to the flowchart shown in FIG. 7A, an example of the processing by the memory deleting function in the radio communication module 3 will be described. Notably, the memory deleting function is provided in the radio communication module 3.

If the processing by the memory deleting function starts (step S81), whether the PC is powered on or not is determined (step S82). If so, data in a memory (such as the hard disk 10 and the main memory 11) of the PC is deleted (step S83). Then, the processing ends (step S84).

With reference to the flowchart shown in FIG. 7B, an example of the processing by the warning sound output processing function in the radio communication module 3 will be described. Notably, the warning sound output processing function is provided in the radio communication module 3.

If the processing of the warning sound output processing function starts (step S91), whether the PC is powered on or not is determined (step S92). If so, a speaker of the PC is controlled to output a warning sound (step S93). Then, the processing ends (step S94).

With reference to the flowchart shown in FIG. 7C, an example of the processing by the positional information transmission processing function in the radio communication module 3 will be described. Notably, the positional information transmission processing function is provided in the radio communication module 3.

If the processing of the positional information transmission processing function starts (step S101), the GPS function, for example, may be used to obtain its positional information (step S102). Then, an e-mail including the positional information is transmitted to a pre-registered address (step S103). Then, the processing ends (step S104).

The e-mail transmission here may be the periodical transmission of such an e-mail or transmission of such an e-mail at every predetermined distance from the reference position.

As described above, the radio communication apparatus in this embodiment (.or the radio communication module 3 in this embodiment) has the GPS functions 33, 35 and 36, is internally included in or is removably connected to an information processing apparatus (or a PC in this embodiment) and operates with the power supplied from the information processing apparatus. The radio communication apparatus includes the charging functions 31 and 32 charging the power supplied from the information processing apparatus, the reference position setting functions 33 to 38 setting a reference position, the positional information setting functions 36 to 38 presetting a positional information about the reference position for performing a security mode, the calculating function 36 calculating the difference between the positional information set by the reference position setting function and its positional information obtained by the corresponding GPS function and the security mode performing functions 34 to 38 performing processing set under the security mode if its position is off the range of the positional information set by the positional information setting functions on the basis of the calculation result by the calculating function. In this case, if the information processing apparatus is powered off, the radio communication apparatus operates with the power by the charging function.

The radio communication apparatus in this embodiment (or the radio communication module 3 in this embodiment) may further include the radio communication functions 34 to 36, and the radio communication apparatus may receive GPS assist data transmitted from a network by the radio communication function and calculate its positional information.

An information processing apparatus (or a PC in this embodiment) including the radio communication apparatus (or the radio communication module 3 in this embodiment) as described above may be provided.

In this way, the radio communication apparatus in this embodiment (or the radio communication module 3 in this embodiment) includes the charging function charging power supplied from the information processing apparatus (or the PC in this embodiment). Therefore, when the information processing apparatus is powered off, the security mode is started, and the positional information obtained by the corresponding GPS function and the preset reference positional information are compared to perform processing under a security mode.

The radio communication apparatus in this embodiment can perform processing under a security mode when it is away from the reference position by a predetermined distance or can perform processing under a security mode in accordance with the content of the received e-mail.

The radio communication apparatus in this embodiment set to the security mode can be configured to transmit an e-mail describing that the security mode has been set to a pre-registered e-mail address. This can further enhance the convenience.

Here, the e-mail transmission may have a configuration that the e-mail is periodically transmitted or a configuration that the e-mail is transmitted when the radio communication apparatus is away from the reference position by a predetermined distance.

As described above, the processing of the e-mail transmission under a security mode in the radio communication apparatus in this embodiment may include transmitting an e-mail describing that the security mode has been set to a pre-registered address when the security mode is set, obtaining its positional information and transmitting an e-mail including positional information to a pre-registered address, transmitting obtained positional information to a pre-registered address after a lapse of a predetermined period of time or after the movement by a predetermined distance (or if the previous positional information and the current positional information are different) when the security mode is set.

The implementation of the functions relating to the security of the radio communication apparatus can take the security measures against the information leakage from a forgotten or stolen PC, for example.

More specifically, without the installation of an expensive security tool to take security measures, the fact that the radio communication apparatus is away from the reference position can be notified to the owner, for example. Furthermore, the details of the security processing can be set by a user arbitrarily to take appropriate measures, which can prevent the leakage of configuration information at low costs. Furthermore, because an e-mail may be used to boot a PC even after a user left the office, the user can effectively use his/her time.

Because a user can perform processing under a security mode in accordance with the content of the e-mail transmitted to the radio communication apparatus, the processing under the security mode can be performed by a user when he/she notices that it has been stolen, for example, before the processing under the security mode is performed automatically. This can enhance the prevention of the information leakage.

Here, the radio communication apparatus (or the radio communication module 3 in this embodiment) is also available for the Internet connection as conventional.

The radio communication apparatus in this embodiment (or the radio communication module 3 in this embodiment) may be removably connected to an interface such as a USB. However, it may allow a thief the removal of the radio communication apparatus to prevent the execution of processing under a security mode. Therefore, the radio communication apparatus may be preferably internally included. However, an interface connectable radio communication apparatus may be implemented.

The information processing apparatus in this embodiment may be allowed to supply power to the radio communication apparatus even when the information processing apparatus is powered off. For example, if the remaining amount of an auxiliary power (or the auxiliary power 32 in the radio communication module 3 in this embodiment) of the radio communication apparatus is equal to or lower than a predetermined value (or lower than a predetermined value), the radio communication apparatus can operate with the power supplied from a battery in the information processing apparatus or from an external power supply.

Notably, the radio communication module 3 (which is an example of the radio communication apparatus) is internally included in or is removably connected to the PC in this embodiment (which is an example of the information processing apparatus).

The radio communication module 3 in this embodiment includes GPS functions (such as the functions of the GPS receiving unit 33, baseband unit 35 and control unit 36) and the radio communication function (such as the functions of the cellular phone radio unit 34, baseband unit 35 and control unit 36). The functions of the circuit for charging 31 and auxiliary power 32 are included in the charging means, the functions of the GPS receiving unit 33, cellular phone radio unit 34, baseband unit 35, control unit 36, ROM/RAM 37 and control IF 38 are included in the reference position setting means. The functions of the control unit 36, ROM/RAM 37 and control IF 38 are included in the positional condition setting means, and the function of the control unit 36 is included in the positional condition determining means. The functions of the cellular phone radio unit 34, baseband unit 35, control unit 36, ROM/RAM 37 and control IF 38 are included in the security mode processing performing means.

Notably, the correspondences between the processing units and the means (or functions) above are described for the illustration purpose only and may vary.

A second embodiment of the invention will be described.

Figure 9:
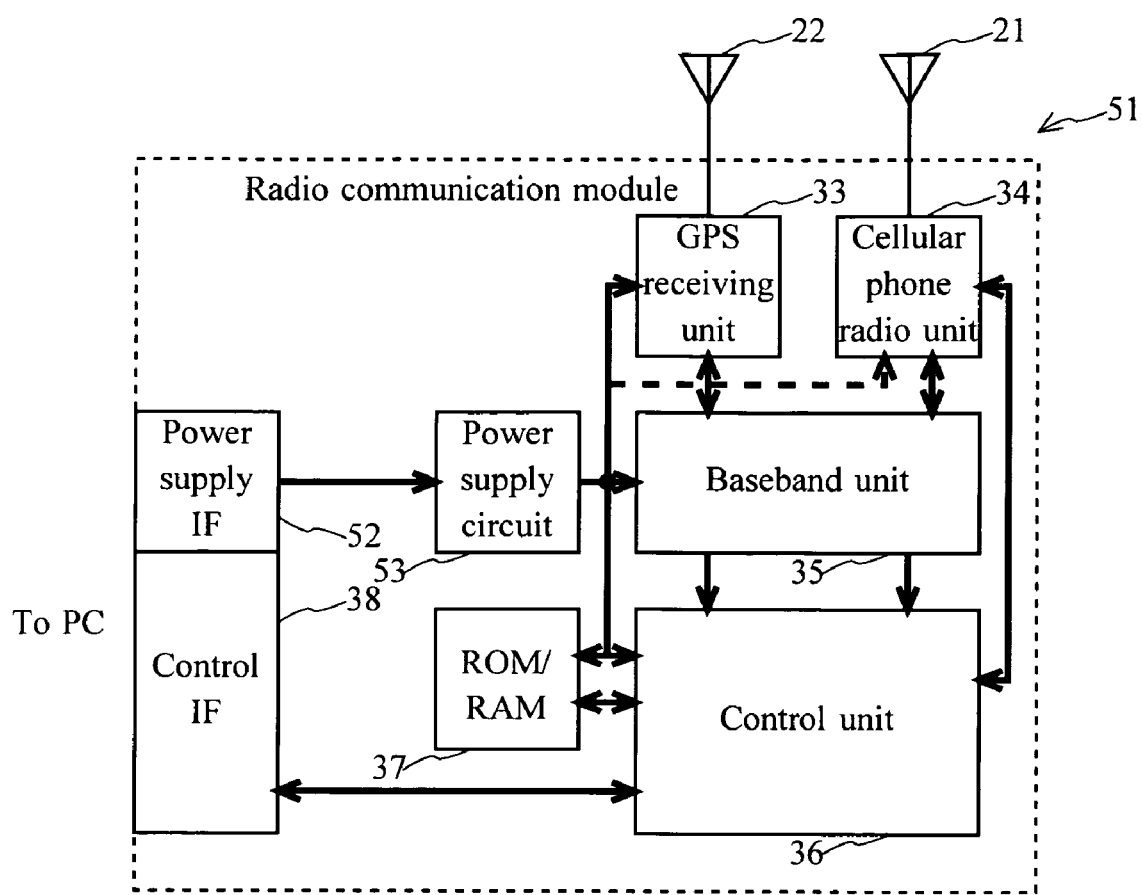
FIG. 9 is a diagram showing a configuration example of the radio communication module according to a second embodiment of the invention.

FIG. 9 shows a configuration example of a radio communication module 51 in this embodiment.

The radio communication module 51 in this embodiment includes a GPS receiving unit 33, a cellular phone radio unit 34, a baseband unit 35, a control unit 36, a ROM/RAM 37, a control interface (control IF) 38, a power supply interface (power supply IF) 52 and a power supply circuit 53.

An antenna 21 of the cellular phone radio unit 34 is an antenna for cellular phone communication, and an antenna 22 of the GPS receiving unit 33 is an antenna for receiving data from a GPS.

Here, in FIG. 9, the same reference numerals refer to similar processing units to those shown in FIG. 2, and detail descriptions will be omitted herein.

The radio communication module 51 in this embodiment is included in a schematically similar personal computer (PC) to the one shown in FIG. 1 and is provided instead of the radio communication module 3 shown in FIG. 1. In the PC in this embodiment, with input from (at least) the battery 1 or the external power supply even when the power supply switch 7 is at (not only the on-state but also) the off state, the power supply control unit 2 is configured such that the radio communication module 51 can receive power supply. Alternatively, wiring for implementing such power supply is provided therein.

The radio communication module 51 of this embodiment will be described.

The radio communication module 51 of this embodiment has a similar configuration and performs similar operations to those of the radio communication module 3 shown in FIG. 2 except that it does not include charging-related processing unit (such as the circuit for charging 31 and the auxiliary power 32).

In the radio communication module 51 of this embodiment, the power supply IF 52 is an interface connecting to the power supply control unit 2 of a PC (or the battery 1 shown in FIG. 1 or an external power supply, for example). The power supply circuit 53 supplies voltage supplied from the power supply IF 52 to the blocks.

As described above, the radio communication module 51 of this embodiment can operate with the power supplied from the battery 1 or an external power supply through the power supply IF 52 even when information processing apparatus is powered off. The radio communication module 51 of this embodiment can provide similar effects to those by the radio communication module 3 shown in FIG. 2 except that it does not include a charging-related processing unit.

The system and apparatus according to the invention are not always limited to those described above and may have various configurations. The invention can be provided as a method or scheme for implementing the processing according to the invention or as a program for implementing the method or scheme or a recording medium recording the program and can be provided as one of various systems or apparatus.

The applicable fields of the invention are not always limited to those described above, but the invention is applicable to various fields.

The processing to be performed in a system or apparatus according to the invention may have a configuration to be controlled by a control program stored in a ROM (Read Only Memory), which is executed by a processor in a hardware resource including the processor and the memory. The function means for performing the processing, for example, may be configured as independent hardware circuits.

The invention can be grasped as a computer-readable recording medium, such as a floppy (registered trademark) disk and a CD (Compact Disc) -ROM, storing the control program or the program (itself). The control program may be input from the recording medium to a computer and be executed by a processor, whereby the processing according to the invention can be implemented.

What is claimed is:

1. A radio communication apparatus having a GPS function, being internally included in or being removably connected to an information processing apparatus and operating with a power supplied from the information processing apparatus, the radio communication apparatus comprising:
    charging means for charging the power supplied from the information processing apparatus;
    reference position setting means for setting a reference position;
    positional condition setting means for setting a positional condition about the reference position which is a condition for performing the processing under a predetermined security mode;
    positional condition determining means for determining whether the condition for performing the processing under a predetermined security mode is obtained or not on a basis of the positional condition set by the positional condition setting means and its positional information obtained by the GPS function; and
    security mode processing performing means for performing processing under a predetermined security mode if the positional condition determining means determines that the condition for performing the processing under a predetermined security mode is obtained,
    wherein, if the information processing apparatus is powered off, the radio communication apparatus operates with the power charged by the charging means.

2. The radio communication apparatus according to claim 1, the apparatus having a radio communication function,
    wherein the radio communication apparatus receives GPS assist data transmitted from a predetermined network by the radio communication function and obtains its positional information.

3. An information processing apparatus comprising the radio communication apparatus according to claim 1.

4. The radio communication apparatus according to claim 1, wherein the processing under a predetermined security mode includes processing of locking the information processing apparatus.

5. The radio communication apparatus according to claim 1, wherein the processing under a predetermined security mode includes processing of powering on the information processing apparatus.

6. The radio communication apparatus according to claim 1, wherein the processing under a predetermined security mode includes processing of powering off the information processing apparatus.

7. The radio communication apparatus according to claim 1, wherein the processing under a predetermined security mode includes processing of deleting information stored in a predetermined memory in the information processing apparatus.

8. The radio communication apparatus according to claim 1, wherein the processing under a predetermined security mode includes processing of outputting a warning sound.

9. The radio communication apparatus according to claim 1, wherein the processing under a predetermined security mode includes processing of transmitting an e-mail including its positional information to a predetermined e-mail address or a predetermined apparatus.

10. The radio communication apparatus according to claim 9, wherein the e-mail has information describing that a security mode has been set.

11. A radio communication apparatus having a GPS function, being internally included in or being removably connected to an information processing apparatus and operating with a power supplied from the information processing apparatus, the radio communication apparatus comprising:
reference position setting means for setting a reference position;
positional condition setting means for setting a positional condition about the reference position which is a condition for performing the processing under a predetermined security mode;
positional condition determining means for determining whether the condition for performing the processing under a predetermined security mode is obtained or not on a basis of the positional condition set by the positional condition setting means and its positional information obtained by the GPS function; and
security mode processing performing means for performing processing under a predetermined security mode if the positional condition determining means determines that the condition for performing the processing under a predetermined security mode is obtained,
wherein, even if the information processing apparatus is powered off, the radio communication apparatus operates with the power supplied from the information processing apparatus.

12. The radio communication apparatus according to claim 11, the apparatus having a radio communication function,
wherein the radio communication apparatus receives GPS assist data transmitted from a predetermined network by the radio communication function and obtains its positional information.

13. An information processing apparatus comprising the radio communication apparatus according to claim 11.

14. The radio communication apparatus according to claim 11, wherein the processing under a predetermined security mode includes processing of locking the information processing apparatus.

15. The radio communication apparatus according to claim 11, wherein the processing under a predetermined security mode includes processing of powering on the information processing apparatus.

16. The radio communication apparatus according to claim 11, wherein the processing under a predetermined security mode includes processing of powering off the information processing apparatus.

17. The radio communication apparatus according to claim 11, wherein the processing under a predetermined security mode includes processing of deleting information stored in a predetermined memory in the information processing apparatus.

18. The radio communication apparatus according to claim 11, wherein the processing under a predetermined security mode includes processing of outputting a warning sound.

19. The radio communication apparatus according to claim 11, wherein the processing under a predetermined security mode includes processing of transmitting an e-mail including its positional information to a predetermined e-mail address or a predetermined apparatus.

20. The radio communication apparatus according to claim 19, wherein the e-mail has information describing that a security mode has been set.

* * * * *